(12) United States Patent
Schwarz et al.

(10) Patent No.: US 12,447,272 B2
(45) Date of Patent: Oct. 21, 2025

(54) ELECTRICAL CONNECTION BETWEEN PUMP HOUSING AND FRONT LID

(71) Applicant: B. Braun Melsungen AG, Melsungen (DE)

(72) Inventors: Jan Schwarz, Melsungen (DE); Christoph Erlen, Kassel (DE); Carsten Niemeier, Kassel (DE); Stefan Batzdorf, Fulda (DE); Michael Kauba, Fuldabrueck (DE); Michael Ostermoeller, Bad Hersfeld (DE); Stephan Hoevel, Kassel (DE); Mario Richardt, Zierenberg (DE)

(73) Assignee: B. Braun Melsungen AG, Melsungen (DE)

( * ) Notice: Subject to any disclaimer, the term of this patent is extended or adjusted under 35 U.S.C. 154(b) by 101 days.

(21) Appl. No.: 17/968,483

(22) Filed: Oct. 18, 2022

(65) Prior Publication Data
US 2023/0120310 A1 Apr. 20, 2023

(30) Foreign Application Priority Data
Oct. 19, 2021 (DE) ...................... 10 2021 127 120.7

(51) Int. Cl.
*A61M 5/145* (2006.01)
*E05D 11/00* (2006.01)
(Continued)

(52) U.S. Cl.
CPC ..... *A61M 5/14546* (2013.01); *E05D 11/0081* (2013.01); *F04B 17/03* (2013.01);
(Continued)

(58) Field of Classification Search
CPC ........ F04B 49/06; F04B 49/065; F04B 53/16; A61M 5/14546; A61M 2205/0233;
(Continued)

(56) References Cited

U.S. PATENT DOCUMENTS 3,860,312 A * 1/1975 Gordon, Jr. ............ H01R 39/64
439/31
10,365,686 B2 * 7/2019 Tucker .................. F16H 19/001
(Continued)

FOREIGN PATENT DOCUMENTS

DE 102006008531 A1 8/2007
DE 102018108625 A1 * 10/2019 ......... E05D 11/0081
(Continued)

OTHER PUBLICATIONS

Haeuslein, "Switch cabinet Electrical grounding hinge replaces grounding straps on control cabinet doors," Konstructions, www.DeepL.com/Transla, Sep. 14, 2022, with translation, 6 pages.
(Continued)

*Primary Examiner* — Philip E Stimpert
(74) *Attorney, Agent, or Firm* — Christopher A. Rothe; CM Law

(57) ABSTRACT

A medical pump includes a cuboid pump housing and a front lid that is pivotably hinged to the pump housing. The front lid includes a display, in particular a touch display, and/or operating elements. The front lid is attached to the pump housing with at least one first hinge element and at least one second hinge element. The at least one first hinge element and/or the at least one second hinge element includes or forms at least one electrical connection between the pump housing and the front lid for electrical linking and exchange of data.

14 Claims, 5 Drawing Sheets

(51) Int. Cl.
*F04B 17/03* (2006.01)
*F04B 53/16* (2006.01)

(52) U.S. Cl.
CPC ..... *F04B 53/16* (2013.01); *A61M 2205/0233* (2013.01); *A61M 2205/3576* (2013.01); *A61M 2205/502* (2013.01)

(58) Field of Classification Search
CPC .... A61M 2205/3576; A61M 2205/502; A61M 5/14232; E05D 11/0081; G06F 1/1681
USPC ...................................................... 417/410.1
See application file for complete search history.

(56) References Cited

U.S. PATENT DOCUMENTS

| 2004/0057855 | A1  | 3/2004 | Gerlach et al. |
| 2014/0100526 | A1* | 4/2014 | Ueda ..................... A61M 5/142 604/151 |
| 2018/0052497 | A1* | 2/2018 | Määttä ...................... E05D 3/12 |
| 2018/0062429 | A1* | 3/2018 | Zhai ..................... H04L 12/2803 |
| 2020/0023127 | A1  | 1/2020 | Simpson et al. |
| 2020/0287937 | A1  | 9/2020 | Weiler et al. |
| 2021/0083884 | A1  | 3/2021 | Poltorak |

FOREIGN PATENT DOCUMENTS

| DE | 202021101548 U1 | 7/2021 |
| EP | 1374932 B1 | 4/2006 |

OTHER PUBLICATIONS

Search Report received in German Application No. 10 2021 127 120.7 dated Sep. 14, 2022, with translation, 12 pages.
Search Report received in European Application No. 22202524.9-1213 dated Mar. 2, 2023, with translation, 15 pages.

* cited by examiner

ELECTRICAL CONNECTION BETWEEN PUMP HOUSING AND FRONT LID

CROSS-REFERENCE TO RELATED APPLICATIONS

This application claims priority under 35 U.S.C. § 119 to German Application No. 10 2021 127 120.7, filed Oct. 19, 2021, the content of which is incorporated by reference herein in its entirety.

FIELD

The present disclosure relates to a medical pump, in particular a fluid pump, and to its electrical connection between the pump housing and the front plate.

BACKGROUND

In medicine, fluid pumps, in particular syringe pumps and hose pumps are frequently used for supplying a patient with a defined dose of drugs. Since such fluid pumps are expensive medical equipment, not every patient site is, as a rule, equipped with such medical pump, but the medical pump is installed at the patient site where necessary. For this reason, such medical pumps are often mobile and/or partially mobile devices which are taken by a practitioner to the patient and/or patient site concerned and are installed there.

Known pumps comprise touch displays and/or screens and keys on which information is output and users may input instructions to the pump. Thus it is, for instance, possible to input the correct drug and a dose. In the case of a syringe pump the model of the syringe and the dose of the drug may be input. In so doing, there is the necessity of providing an electrical connection for voltage supply and data transfer between a pump housing and the display in the front lid.

For such an electrical connection the use of a display cable, in particular a flat ribbon cable, is known from the state of the art. A flat ribbon cable has the disadvantage that it is either bent again and again due to the pivotable front lid. Moreover, the use of a display cable is predestined for pollution.

Therefore, it is an object of the present disclosure to remedy or at least mitigate the disadvantages of the state of the art. Furthermore, it is an object to provide an electrical connection between the pump housing and the front lid which is both cost-efficient and of robust design.

The medical pump comprises a cuboid pump housing and a front lid which is pivotably hinged to the pump housing and in which a display, in particular a touch display, and/or operating elements are provided. The front lid is mounted to the pump housing with at least one first and at least one second hinge element. The at least one first and/or the at least one second hinge element is provided and designed to comprise and/or to form at least one electrical connection between the pump housing and the front lid for electrical linking, supply, and for the exchange of data.

In other words, the medical pump has a pump housing, at the front side of which a pivotably mounted front lid is provided in which a display and/or indicator and/or operating elements are accommodated. The front lid is mounted on the pump housing by means of two or a plurality of hinge elements/hinges. The one or the plurality of hinge elements each implement an electrical connection between the pump housing and the front lid.

This solves the problem of the electrical linking of the front lid with the pump housing with respect to energy, data, and mass, and at the same time pollution which is accompanied by a flat ribbon cable can be avoided. Moreover, the manufacturing costs may be reduced by this solution as compared to the state of the art. Due to the effect that no cable is bent during the swinging open and swinging shut of the front lid, the robustness and lifetime are also increased. Furthermore, the kind of providing an electrical connection is less susceptible to disturbances, for instance, with respect to electromagnetic compatibility.

Further advantageous aspects of the present disclosure will be described in the following description.

It is preferred if the at least one first and/or at least one second hinge element is subject to a mass potential. This means that the one or the plurality of hinge elements are subject to the ground potential.

It is of advantage if the at least one first and/or the at least one second hinge element are provided and designed to be electrically connected at the pump housing side with a first internal circuit board of the pump housing and at the front lid side with a second internal circuit board of the front lid.

Furthermore, it is preferred if the at least one first and/or second hinge element is provided and designed for the exchange of electrical potentials.

It is of advantage if the at least one first or second hinge element is provided and designed to transfer electrical mass potentials.

Moreover, it is preferred if the at least other first and/or second hinge element is provided and designed to transfer at least a supply voltage and/or at least a data signal.

In other words, it can be combined arbitrarily whether a first hinge element transfers the electrical mass potential and a second hinge element the supply voltage, or whether a first hinge element transfers the electrical mass potential and a second hinge element the data signal and the supply voltage. Alternatively, an own hinge element may be provided for the electrical mass potential and for the supply voltage and for the data signal, respectively.

This means that the electrical connections serve for the exchange of electrical potentials and that one or a plurality of hinges are used for the transfer of the electrical mass potential, and additionally one other or a plurality of other hinges are used for the transfer of one or a plurality of supply voltages. A combined transfer of different signals per hinge is conceivable, for instance, of mass potential and supply voltage or mass and data signals.

It is of advantage if the data signal is transferrable by means of modulation, in particular by means of pulse width modulation or by means of impressing of a higher frequent small signal or by means of frequency-division multiplexing, on the supply voltage or a carrier signal. Frequency-division multiplexing (FDM or frequency-division multiple access, FDMA) is a telecommunications multiplexing method by means of which a plurality of signals can be transferred simultaneously to a plurality of carriers in a distributed manner. The carriers are assigned to a plurality of different frequencies, which is why the term frequency multiplexing is used.

In other words, the electrical connection serves for the transfer of information and data. It is provided that one further or further hinges are used for the transfer of one or a plurality of data signals. The exchange of data is inter alia provided by modulation, for instance, on the supply voltage or another carrier signal. This has the advantage that the use of two hinges is sufficient.

It is preferred if a control unit is disposed in the pump housing which is provided and designed to communicate with the front lid.

In other words this means that it is of advantage if the exchange of data is used for coupling the display and/or the operating elements in the front lid with a control unit in the pump housing. This has the advantage that the flat ribbon cable between the front lid and the pump housing from the state of the art is omitted. Moreover, signal lines are thus protected from disturbances from outside.

It is of advantage if the at least one first and/or the at least one second hinge element is formed with a hinge bolt and a hinge bolt sleeve, wherein the hinge bolt is guided inside the hinge bolt sleeve on the swivel axis.

Preferably, the hinge bolt is grounded.

It is of advantage if, through the at least one first and/or the at least one second hinge element, preferably through the hinge bolt, at least one electrical conductor is guided which is electrically connected at the pump housing side with an internal circuit board of the pump housing and/or at the front lid side with an internal circuit board of the front lid.

It is preferred if the at least one first and/or the at least one second hinge element, preferably the hinge bolt, is electrically connected with the internal circuit board of the pump housing by means of at least one electrically conductive spring and/or with the internal circuit board of the front lid by means of at least one further electrically conductive spring.

Preferably, the hinge bolt is connected with the electrically conductive spring, wherein the spring presses on a mass face of the internal circuit board.

It is of advantage if the at least one first and/or the at least one second hinge element, preferably the hinge bolt, is electrically connected with the internal circuit board of the pump housing by means of at least one electrically conductive spring, and if, through the at least one first and/or the at least one second hinge element, preferably through the hinge bolt, at least one electrical conductor is guided which is electrically connected at the front lid side with an internal circuit board of the front lid.

In other words, the electrical connection/linking of the hinge axis and/or of the hinge bolt to the first and/or second internal electrical circuit board of the front lid and/or of the main body may be implemented as follows. The electrical connection/linking may take place by means of an electrically conductive spring acting on the axis and/or the hinge bolt. Alternatively or additionally the electrical connection/linking may take place by the electrical conductor which is provided and designed to extend inside the hinge bolt on the hinge axis/swivel axis. Furthermore, an electrical conductor guided through the hinge bolt may be connected at both sides to the first and second internal circuit boards of the front lid and/or the pump housing. Possible implementations are optionally provided in a symmetrical form through both axes of the hinges.

BRIEF DESCRIPTION OF THE DRAWINGS

The disclosure will be explained in detail in the following by means of a preferred embodiment with the aid of Figures.

DETAILED DESCRIPTION

In the following, embodiments of the present disclosure will be described on the basis of the associated Figures.

Figure 1:
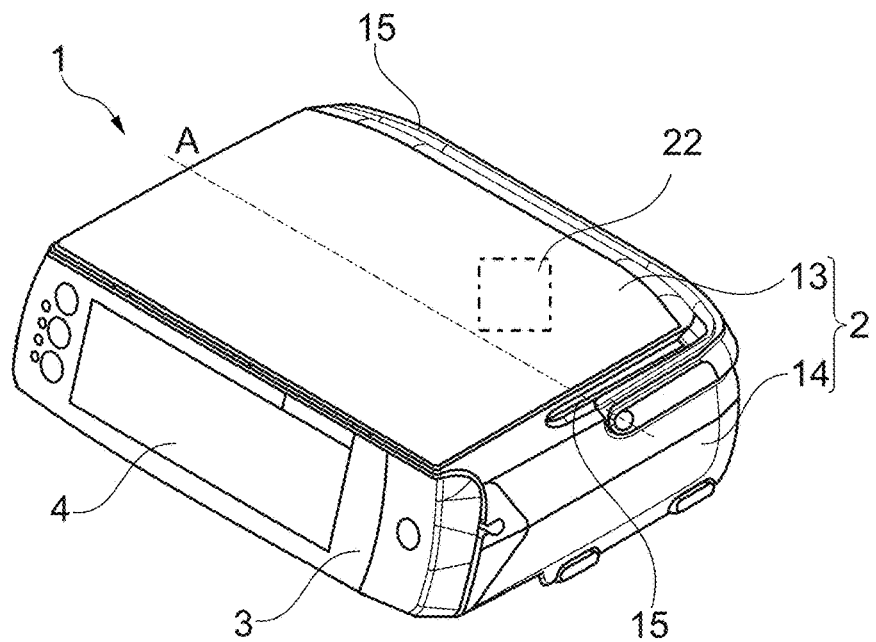
FIG. 1 is a perspective view of a medical pump in accordance with the disclosure according to the preferred embodiment.
Figure 2:
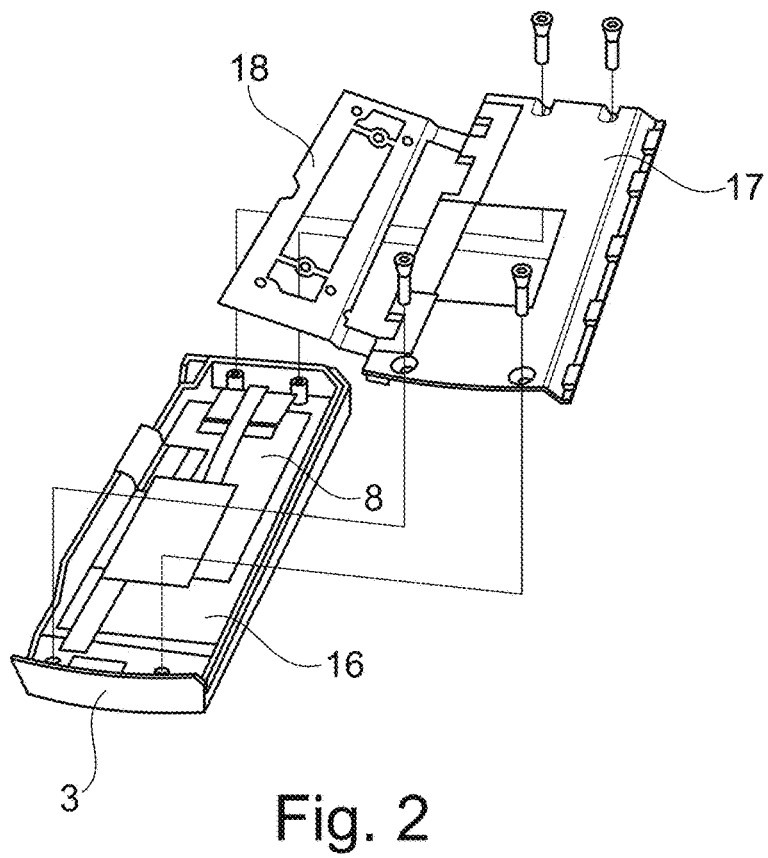
FIG. 2 is a representation for illustrating a front lid with a back shell in accordance with the preferred embodiment.

In FIG. 1, a medical pump 1 in accordance with the preferred embodiment is shown. The medical pump 1 shown in FIG. 2 is designed as an infusion pump. It is to be understood that the medical pump 1 in accordance with the disclosure may also be designed as a syringe pump. As illustrated in FIG. 1, the medical pump 1 comprises a substantially cuboid pump housing 2 having a fluid pump 22 therein, and to the front side of which a front lid 3 is pivotably hinged. A plurality of operating keys, a plurality of signal lamps, and a display 4 are arranged at a front side of the front lid 3 to control the fluid pump 22.

The pump housing 2 further comprises a housing upper shell/housing upper side 13 and a housing lower shell/housing lower side 14 which can preferably be connected releasably with each other and thus form the pump housing 2. A carrying handle 15 designed as a U-shaped gripping bracket is pivotably hinged to the housing upper shell 13. The carrying handle 15 encompasses the housing upper shell 13 in a width direction of the medical pump 1 and/or a front lid longitudinal direction.

FIG. 2 shows a rear side of the front lid 3 with a mounted operating unit 16 which is illustrated from the rear. A rear wall 17 is placed on the front lid 3 of the operating unit 16. The rear wall 17 is substantially a flat plate and is screwed with the front lid 3. The rear wall 17 protects the internal circuit board 8 and/or the electronics in the front lid 3 and/or the operating unit 16. A metal hinge plate 18 is fastened to the rear wall 17. The hinge plate 18 is foldably connected with the rear wall 17. This means that the hinge plate 18 can be swiveled against the rear wall 17. The hinge plate 18 is connected with the pump housing 2. Thus, the front lid 3 is pivotably connected with the pump housing 2 by the hinge plate 18.

Figure 3:
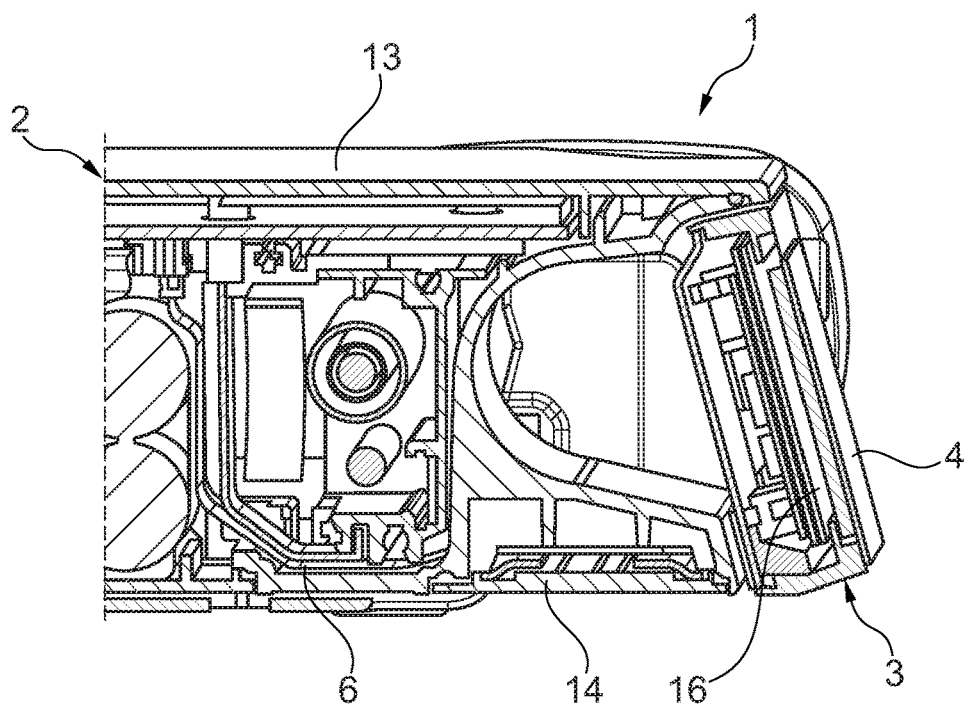
FIG. 3 is a sectional view of the medical pump in the longitudinal direction orthogonally to the front lid longitudinal direction in accordance with the state of the art.

FIG. 3 is a sectional view of the medical pump 2, in particular a syringe pump, in the longitudinal direction orthogonally to the front lid longitudinal direction in accordance with the state of the art. The construction of the infusion pump shown in FIG. 1 is equivalent. FIG. 3 shows the medical pump 1 with the pump housing 2 and the front lid 3. The operating unit 16 and the display 4 are illustrated in the front lid 3. Furthermore, FIG. 3 shows an electrical connection 6 in accordance with the state of the art. The electrical connection is in this case a display cable electrically connecting the electronics in the pump housing 2 with the electronics in the front lid. In accordance with the present disclosure it is essential to replace and/or avoid the display cable.

Figure 4:
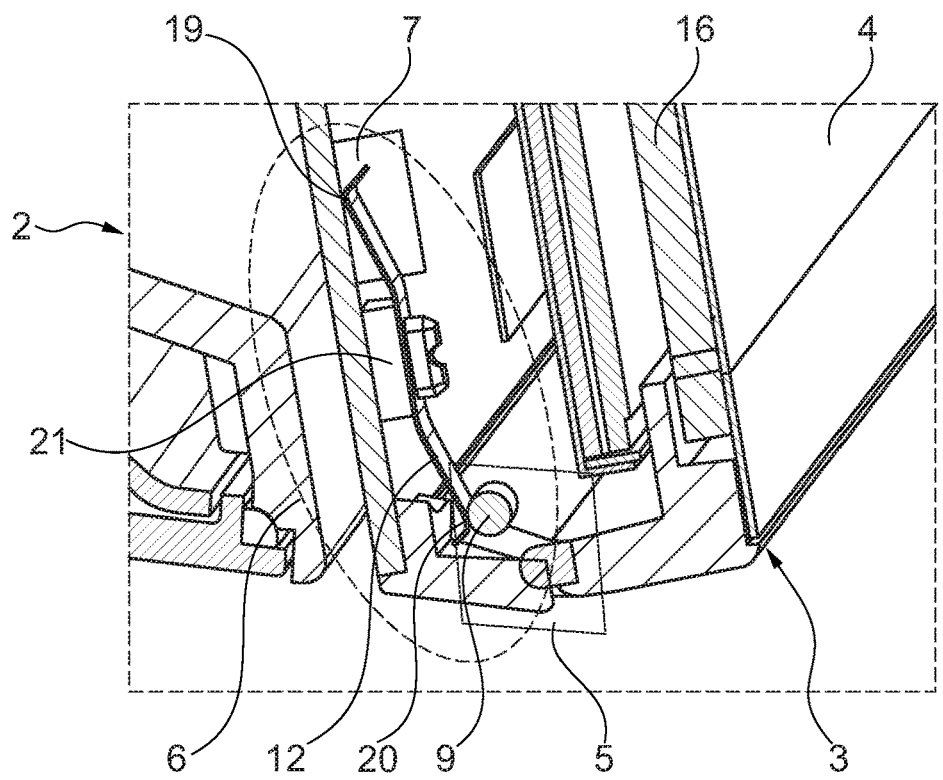
FIGS. 4 and 5 show enlarged sectional views of an electrical connection between the pump housing and the front lid of the medical pump in accordance with a preferred embodiment.
Figure 5:
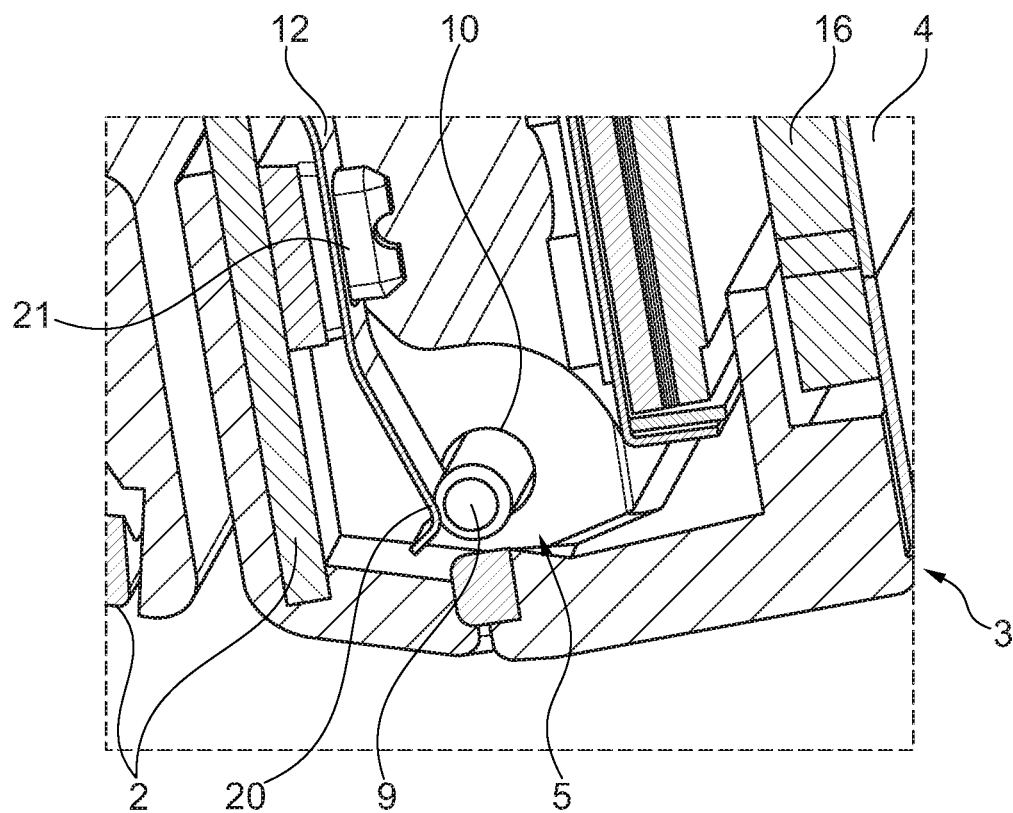

FIGS. 4 and 5 show an enlarged sectional view of an electrical connection 6 between the pump housing 2 and the front lid 3 of the medical pump 1 in accordance with a preferred embodiment. In FIG. 4 and FIG. 5, a first hinge element 5 is provided and designed to comprise at least one electrical connection 6 between the pump housing 2 and the front lid 3 for the electrical supply and for the exchange of data. The hinge element 5 is provided and designed to be electrically connected at the pump housing 2 side with a first internal circuit board 7 of the pump housing 2 and at the front lid 3 side with a second internal circuit board 8 of the front lid 3. The second internal circuit board 8 can be seen in FIG. 2 and the contacting (not illustrated) of the second internal circuit board 8 may be designed in accordance with the illustrated spring 12. The hinge element 5 is formed with a hinge bolt 9 and a hinge bolt sleeve 10 (see FIG. 5), wherein the hinge bolt 9 is guided inside the hinge bolt sleeve 10 on a swivel axis.

The hinge element 5, here the hinge bolt 9, is connected with the first internal circuit board 7 of the pump housing 2 by means of at least one electrically conductive spring 12. A first end 19 of the electrically conductive spring 12 presses on the internal circuit board 7 and a second end 20 contacts the hinge bolt 9, so that an electrical connection 6 is provided. This means that the hinge bolt 9 is designed to be capable of transferring electrical potentials. The electrically conductive spring 12 is mounted to the pump housing 2 with a spring fastener 21 by clamping or screwing.

Figure 6:
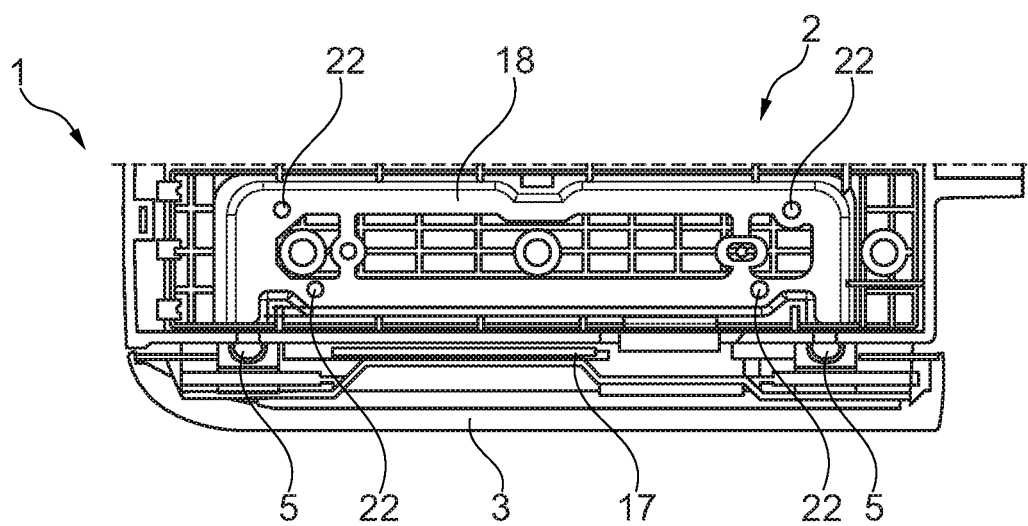
FIG. 6 shows a hinge plate mounted at the lower housing shell of the medical pump in accordance with a preferred embodiment.

FIG. 6 shows a hinge plate 18 mounted to the housing lower shell 14 of the medical pump 1 in accordance with a preferred embodiment. The hinge plate 18 is mounted to a lower side of the housing lower shell 14 of the pump housing 2 by means of four fastening means. At the transition of the hinge plate 18 to the rear wall 17 of the front lid 3 a first and a second hinge element 5 are shown which are designed as an electrical connection.

Figure 7:
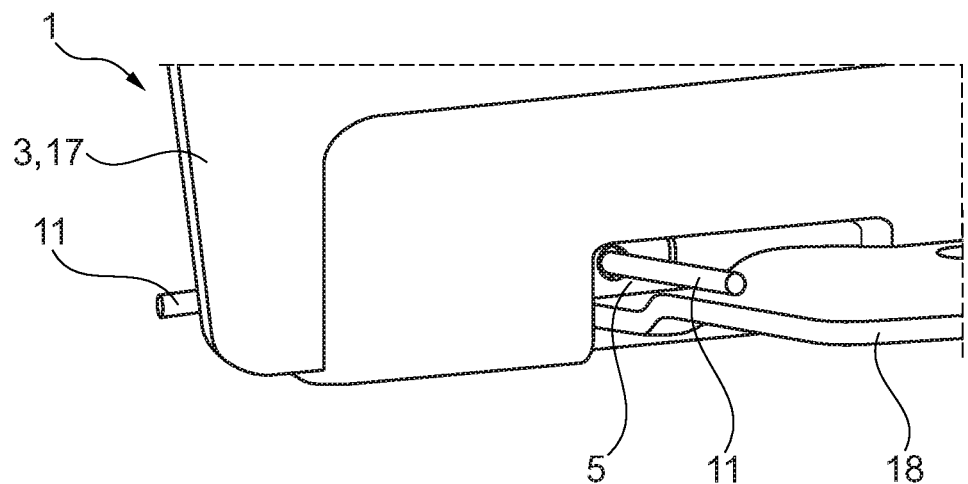
FIG. 7, FIG. 8, and FIG. 9 show an electrical connection of the medical pump in accordance with a further preferred embodiment.
Figure 8:
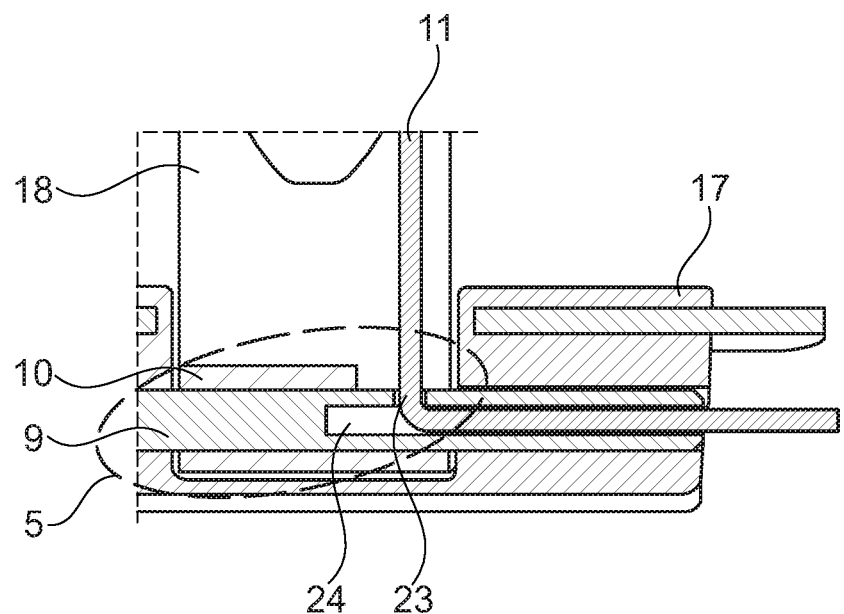
Figure 9:
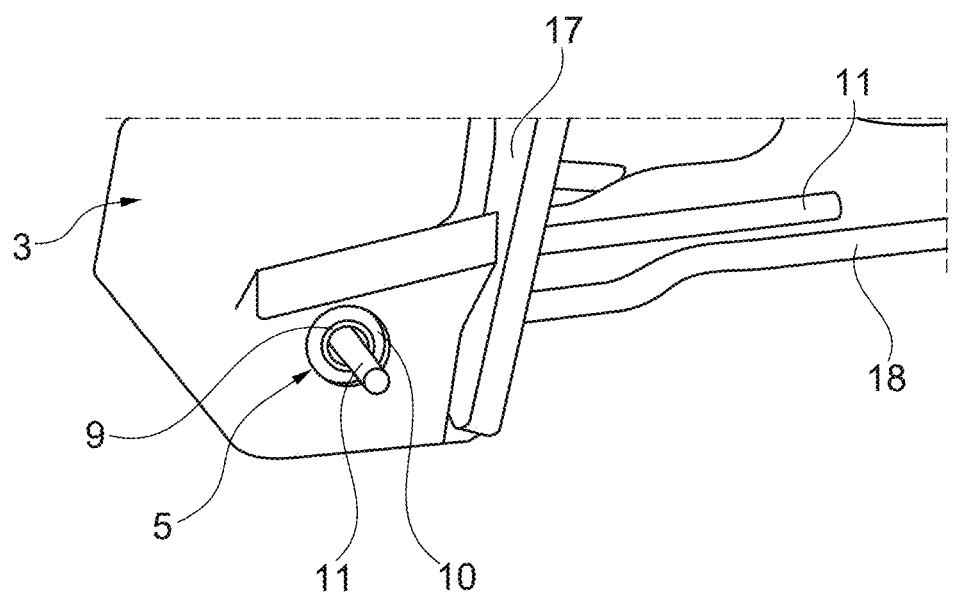

FIG. 7, FIG. 8, and FIG. 9 show an electrical connection 6 of the medical pump 1 in accordance with a further preferred embodiment. FIGS. 7, 8, and 9 show the rear wall 17 mounted to the front plate 3 and the hinge plate 18 connected therewith by the hinge element 5, which is mounted to the housing lower shell 14 of the pump housing 2. In accordance with this embodiment an electrical conductor 11 is guided through the hinge element 5 to provide an electrical connection between the front plate 3 and the pump housing 2.

In FIG. 8 it is shown that the electrical conductor 11 is guided from the rear wall 18 through a hinge bolt opening 23 into a cavity 24 of the hinge bolt 9. In other words, the hinge bolt 9 is at least partially hollow to receive an electrical conductor 11 through a hinge bolt opening 23 disposed in the hinge bolt 9. The electrical conductor 11 and the hinge bolt opening 23 are introduced in the cavity 24 of the hinge bolt 9 such that the electrical conductor 11 is not bent even during a rotating and/or swiveling movement. Thus, one end of the electrical conductor 11 is electrically connected with the first internal circuit board 7 and another end of the electrical conductor 11 with the second internal circuit board 8.

What is claimed:

1. A medical pump comprising:
a pump housing that is cuboid;
a fluid pump located in the pump housing;
a front lid pivotably hinged to the pump housing; and
a display and/or operating elements provided in the front lid, wherein:
the display and/or operating elements are configured to operate the fluid pump,
the front lid is mounted to the pump housing with at least one first hinge element and at least one second hinge element, and
the at least one first hinge element and/or the at least one second hinge element each comprise or form at least one electrical connection between the pump housing and the front lid for electrical linking, supply, and exchange of data,
wherein the at least one first hinge element and/or the at least one second hinge element is configured to be electrically connected at a pump housing side with a first internal circuit board of the pump housing and at a front lid side with a second internal circuit board of the front lid,
wherein:
the at least one first hinge element is formed with a hinge bolt and a hinge sleeve, wherein the hinge sleeve comprises a hinge sleeve passage extending from a first sleeve opening to a second sleeve opening, wherein at least a portion of the hinge bolt extends inside the hinge sleeve passage from the first sleeve opening towards the second sleeve opening, and the hinge bolt is rotatable relative to the hinge sleeve on a swivel axis extending between the first sleeve opening and the second sleeve opening,
the hinge bolt comprises and an internal hinge bolt passage extending from a first bolt passage opening located adjacent to and outside the first sleeve opening to a second bolt passage opening adjacent to the second sleeve opening,
the at least one first hinge element comprises at least one single electrical conductor extending continuously and entirely through the hinge bolt passage and the hinge sleeve passage, from a first location protruding outside the first bolt passage opening and the first sleeve opening to a second location protruding outside the second bolt passage opening and the second sleeve opening, and
wherein the at least one single electrical conductor is electrically connected at the pump housing side with the first internal circuit board of the pump housing and/or at the front lid side with the second internal circuit board of the front lid.

2. The medical pump according to claim 1, wherein the at least one first hinge element and/or the at least one second hinge element is configured for exchanging electrical potentials.

3. The medical pump according to claim 1, wherein the at least one first hinge element is configured to transfer electrical mass potentials.

4. The medical pump according to claim 3, wherein the at least one second hinge element is configured to transfer at least a supply voltage and at least a data signal.

5. The medical pump according to claim 4, wherein the data signal is transferrable by modulation on the supply voltage or a carrier signal.

6. The medical pump according to claim 1, wherein the at least one first hinge element and/or the at least one second hinge element further comprises an additional electrical conductor electrically connected with the first internal circuit board of the pump housing by at least one electrically conductive spring and/or with the second internal circuit board of the front lid by at least one further electrically conductive spring.

7. The medical pump according to claim 1, wherein the at least one single electrical conductor is electrically connected at the front lid side with the second internal circuit board of the front lid.

8. The medical pump according to claim 1, wherein the at least one first hinge element comprises a rotating assembly, and the at least one first hinge element and/or the at least one second hinge element further comprises an additional electrical connection comprising at least one electrically conductive spring configured to slide against the rotating assembly during pivoting of the front lid relative to the pump housing.

9. The medical pump according to claim 1, wherein the hinge bolt is provided on the front lid, and the hinge sleeve is provided on the pump housing, and wherein the hinge bolt is rotatably supported in the hinge sleeve during pivoting of the front lid relative to the pump housing.

10. The medical pump according to claim 8, wherein the hinge bolt comprises a portion of at least one additional electrical connection between the pump housing and the front lid, and the at least one electrically conductive spring is provided adjacent to the hinge sleeve and positioned to slide against the hinge bolt during pivoting of the front lid relative to the pump housing.

11. The medical pump according to claim 10, wherein the at least one electrically conductive spring is positioned to slide against an outer circumference of the hinge bolt during pivoting of the front lid relative to the pump housing.

12. The medical pump according to claim 1, wherein the hinge bolt extends along the swivel axis, and the first bolt passage opening extends radially from the swivel axis.

13. The medical pump according to claim 12, wherein the second bolt passage opening extends axially along the swivel axis and the second bolt passage opening is located concentrically with the second sleeve opening.

14. The medical pump according to claim 1, wherein the at least one single electrical conductor comprises a monolithic body extending entirely from the first location to the second location.

\* \* \* \* \*